United States Patent [19]
Milgram

[11] 3,943,720
[45] Mar. 16, 1976

[54] FLOATING OIL BARRIER

[75] Inventor: Jerome H. Milgram, Cambridge, Mass.

[73] Assignee: Offshore Devices, Inc., Lynn, Mass.

[22] Filed: Aug. 30, 1974

[21] Appl. No.: 501,870

[52] U.S. Cl. .................................................. 61/1 F
[51] Int. Cl.² ......................................... E02B 15/04
[58] Field of Search ......... 61/1 F; 210/242, DIG. 21

[56] References Cited
UNITED STATES PATENTS

| | | | |
|---|---|---|---|
| 3,563,036 | 2/1971 | Smith et al. | 61/1 F |
| 3,713,410 | 1/1973 | Ducrocq et al. | 61/1 F |
| 3,764,015 | 10/1973 | Rolfson | 61/1 F |
| 3,766,739 | 10/1973 | Maelban | 61/1 F |
| 3,775,982 | 12/1973 | Lambolly | 61/1 F |
| 3,802,201 | 4/1974 | Hoult et al. | 61/1 F |
| 3,807,178 | 4/1974 | Tanksley | 61/1 F |

Primary Examiner—Dennis L. Taylor
Attorney, Agent, or Firm—Robert E. Ross

[57] ABSTRACT

An oil barrier for use in the open sea to contain oil on the surface, comprising a flexible barrier provided with a plurality of flotation means only on the outside of the barrier, thereby avoiding churning of the oil and water on the inside of the barrier into an oil-water mixture that could pass under the barrier in rough sea conditions. In one embodiment of the invention, the flotation means is a plurality of inflatable members packaged on the outside surface of the barrier, with a counter weight associated with the flotation means so as to be disposed on the end of the flotation means opposite the barrier when the flotation means is inflated, so that the center of gravity of the assembly is in the desired position in relation to the center of buoyancy thereof.

8 Claims, 6 Drawing Figures

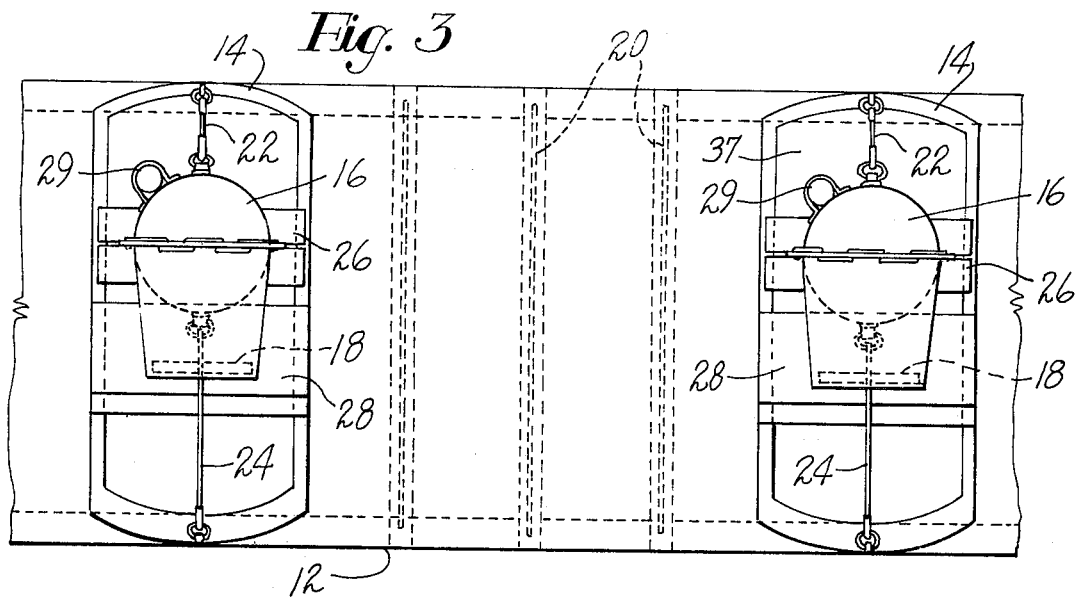
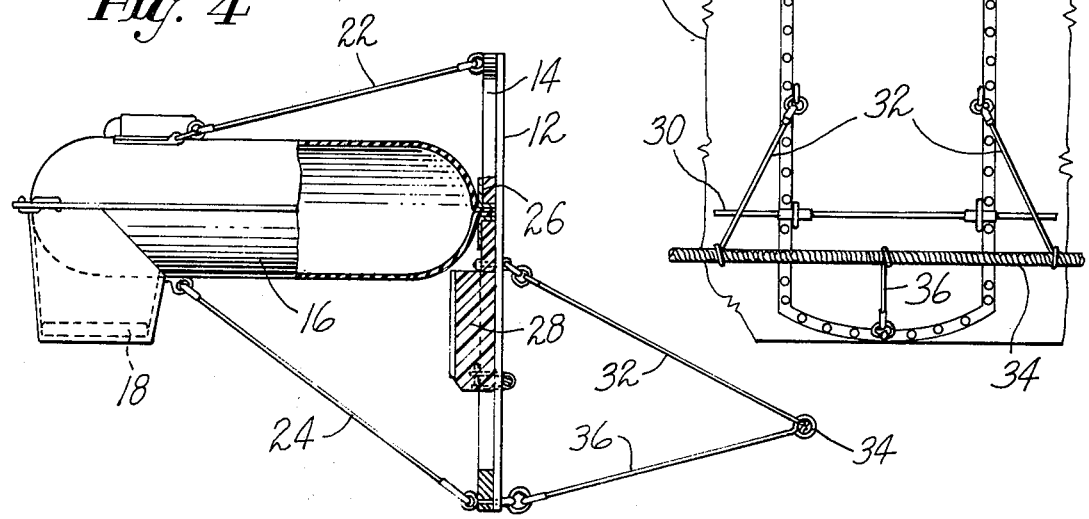
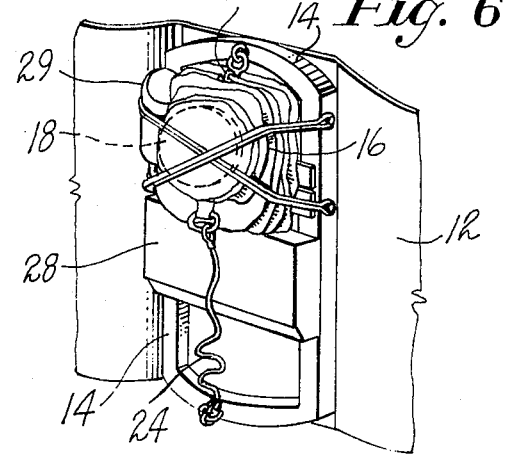

FLOATING OIL BARRIER

BACKGROUND OF THE INVENTION

In U.S. Pat. No. 3,802,201 Apr. 9, 1974, to the present inventor and another, there is disclosed an oil barrier having flotation means disposed on both sides thereof to maintain the barrier upright in the water. Means is also provided for maintaining slack in the barrier between the supporting elements, so that the barrier is not in tension, and each barrier portion is therefore permitted some freedom of movement independently of adjacent barrier portions, to better adapt to the wave motion.

However, the structure disclosed in the above identified patent has a number of disadvantages in that the providing of flotation means on both sides of the barrier makes construction, stowing, and handling difficult, and when in use in rough water, the flotation member on the inside of the barrier slaps the oil surface and churns the oil and water into a mixture having a higher average density than pure oil and, as a result, this mixture can more easily pass under the barrier and escape.

SUMMARY OF THE INVENTION

An oil barrier avoiding the above described disadvantages is provided, in which a series of flotation means is provided which extend away from the barrier on the outside thereof only. A counter-weight is provided at the remote end of the flotation means, to position the center of gravity of the assembly to a desired position in relation to the center of buoyancy thereof. Slack control and tension control means as disclosed in the above identified patent may also be incorporated into the barrier assembly. The counter-weight may be constructed so as to provide a damping action to reduce barrier motion due to wave motion.

BRIEF DESCRIPTION OF THE DRAWING

FIG. 3 is a view in elevation of the outside of the barrier.

FIG. 4 is a view in side elevation of a barrier section of FIG. 3.

FIG. 5 is a view in elevation of the inside of the barrier.

FIG. 6 is a perspective view of a barrier section in the uninflated condition.

DESCRIPTION OF THE ILLUSTRATED EMBODIMENT

Figure 1:
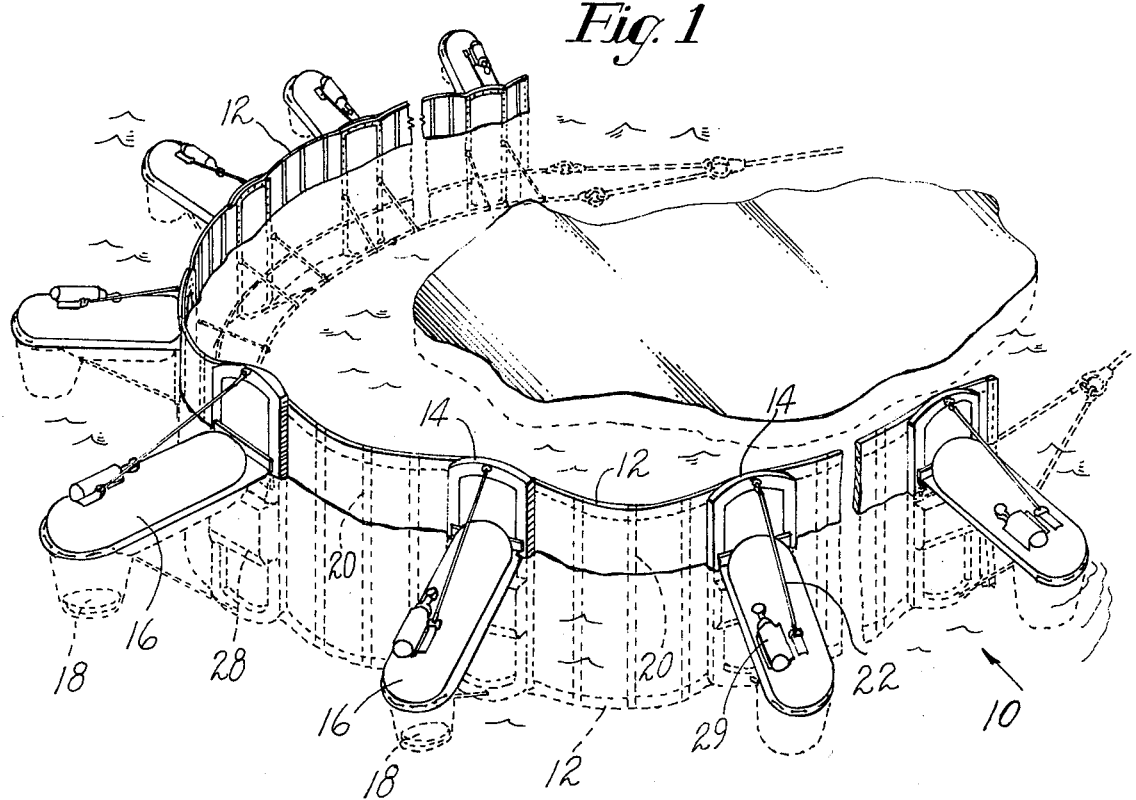
FIG. 1 is a perspective view of an oil barrier assembly embodying the features of the invention.

Referring to the drawings, there is illustrated a barrier assembly 10, which is intended for use in the open sea, to confine an oil slick floating on the surface of the water. The barrier is intended to be air-dropped into the area of the oil slick, and then towed by a surface vessel or helicopter to surround the slick, or to be positioned into a U-shape in the path of drift of the slick, so that the slick can be confined and removed.

The barrier comprises an elongated sheet 12 of flexible material, such as rubber or coated fabric, a plurality of rigid frames 14 attached to one side of the sheet in spaced relation, an inflatable flotation member 16 associated with each frame, and a counter-weight 18 attached to each flotation member at the end remote from the frame, and suitable retaining lines to be described hereinafter.

The sheet 12 may be provided with vertical rigid members 20, such as wooden or plastic strips or rods secured thereto at spaced intervals to impart vertical stiffness to the portion of the sheet disposed between the barriers.

To position the flotation member and counterweight in relation to the frame with which it is associated and to maintain the frame upright in the water, upper and lower retainer lines 22 and 24 are fastened between an outer portion of the flotation member and the top and bottom of the frame.

The end of the flotation member adjacent the barrier is secured to a cross-member 26 on the frame in such a manner as to maintain the flotation member generally perpendicular thereto.

In the illustrated embodiment of the invention, each frame 14 is provided with rigid flotation means 28 disposed thereto at a position such that it will be largely submerged when the barrier is upright in the water. The counter-weight 18 is positioned at the end of the inflatable flotation member to move the center of gravity of the assembly away from the barrier sheet.

The size of the rigid flotation means is such that the buoyancy provided thereby in combination with the buoyancy provided by the inflatable flotation means, locates the center of buoyancy such that it will be the same vertical plane as the center of gravity when the frame 14 is vertical.

The illustrated embodiment of the invention is designed to be stowed in a compact package to be dropped from the air into the vicinity of an oil spill; for this purpose the flotation member is packaged deflated against the frame, and the counter weight 18 is formed of a flexible container such as canvas, containing lead in its bottom, so that it may also be packaged into a relative flat configuration with the flotation member (see Fig. 6). In use the container fills with water to increase the restoring moment when the barrier rolls in a direction which lifts the top of the container out of the water.

Also packaged with each flotation device is a compressed gas bottle 29 connected with a suitable valve to the flotation device to inflate the flotation device. The valve (not shown) may be operated either manually or automatically, as will be described hereinafter.

Figure 2:
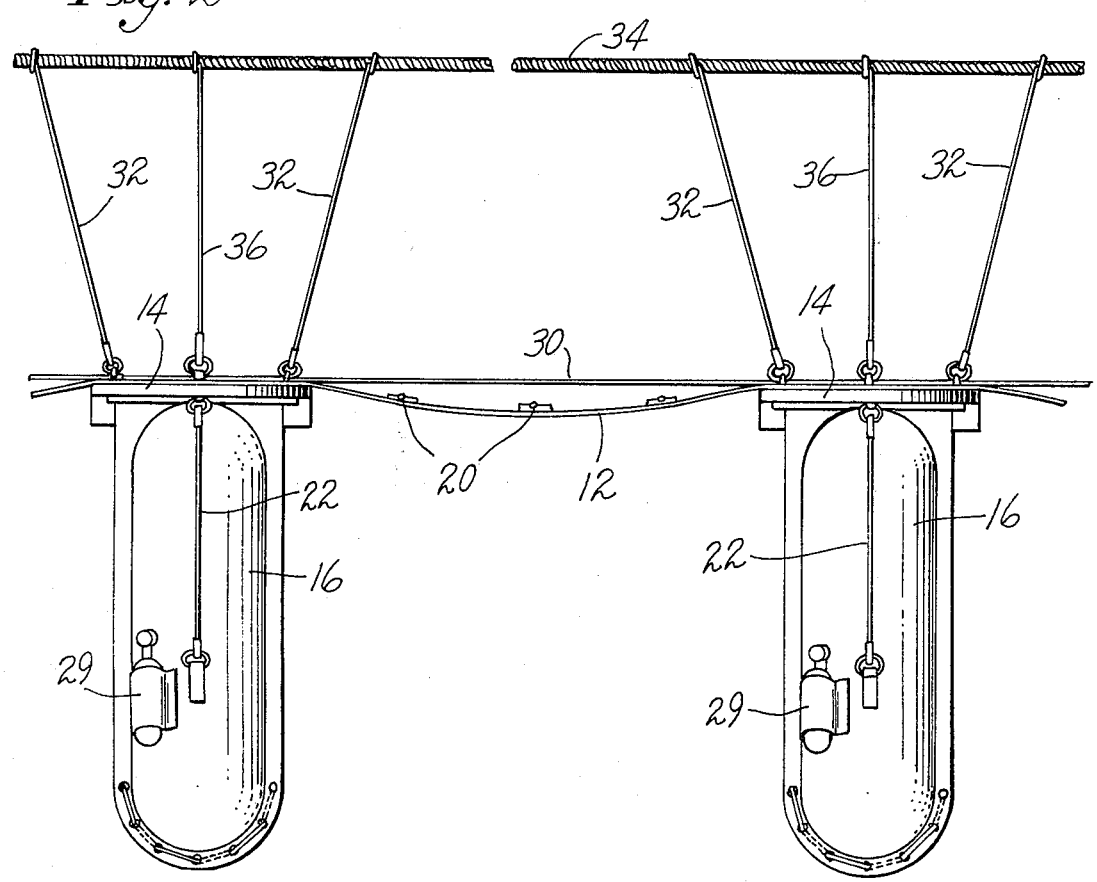
FIG. 2 is an enlarged top plan view of a pair of adjacent barrier sections.

The rigging for controlling the barrier after deployment may be similar to that shown in the identified patent. Adjacent frames 14 may be fastened together by slack control lines 30, which have a length less than the length of the barrier sheet between the frames (see FIG. 2) so that the barrier sheet between the frames is not in tension, but slack, and hence is allowed freedom of movement to enable the barrier to conform to wave action without high stresses being generated in the barrier sheet.

Each frame may be provided with a bridle, comprising a pair of lines 32 extending from the sides of the frame to be attached in spaced relation to a main tension cable 34 and a lower line 36 extending from the bottom of the frame to the same main tension cable.

The entire barrier may then be stowed into a compact package by folding so that it can be carried in an aircraft or a ship to the point of use.

One method of use is to package the barrier into a box of suitable shape, which is dropped at the desired point. After the box lands on the water, the barrier is pulled from the container by a vessel on the surface. If desired, the valves controlling the inflation of the flotation device may be arranged to be actuated automatically, as the barrier sections are pulled from the container, or they may be activated manually. In the illustrated embodiment, the combination of flotation blocks 28 and 31 on the frame provides sufficient buoyancy to prevent the barrier, or a barrier portion, from sinking, in the event that one or more of the flotation members 16 fails to inflate, and maintains the box in the same attitude in the water during and after deployment of the barrier.

When the barrier is deployed around an oil slick (as illustrated in FIG. 1) the inside of the barrier will generally be facing up-wind or up-current, to trap an oil spill traveling in the direction of the wind or current, and hence the inside of the barrier will likely be subjected to more wave action than the outside. However, since the inside of the barrier presents a smooth surface to the oil and oil-water interface, motion of the barrier caused by wave motion minimizes churning at the oil-water interface which could produce an oil-water mixture that could pass under the barrier.

Although in the illustrated embodiment the flotation devices 16 are inflatable, to enable the device to be stowed in a compact package, it will be apparent that if a barrier of the type described herein is to be used in a single location, such as in a harbor, to surround an oil tanker loading or discharging, the flotation members 16 may be made of rigid material such as plastic foam, and the counter-weights may be a solid piece of metal secured to the flotation member at the outer end thereof.

It will also be apparent that the barrier disclosed herein may be used with other bridle arrangements than that disclosed.

Since certain other modifications to the specific embodiment of this invention illustrated herein may be made by one skilled in the art without departing from the scope of the invention, it is intended that the matter contained herein be interpreted in an illustrative and not a limiting sense.

I claim:

1. A floating barrier, comprising a plurality of elongated flotation units, an elongated flexible vertical barrier extending between corresponding ends of the flotation units, said units being attached to one side only of the barrier so as to extend with the longitudinal axes thereof disposed in a horizontal direction and generally perpendicular to the vertical plane of the barrier, and a counter-weight means attached to the distal end of each flotation unit to counter-balance the weight of the barrier, the side of the barrier opposite the flotation units being free of protrusions.

2. A floating barrier as set forth in claim 1 in which said barrier has additional flotation means attached to the surface thereof.

3. A floating barrier as set forth in claim 1 in which said flotation units are inflatable elongated bags.

4. A floating barrier as set forth in claim 1 in which each flotation unit is provided with individual means for inflation thereof.

5. A floating barrier as set forth in claim 1 in which said counter-weight protrudes from the flotation unit and is shaped and positioned to provide a damping action to motion of the flotation unit.

6. In a floating barrier that utilizes an elongated flexible barrier sheet to be vertically disposed in the water, an improved flotation means, comprising a plurality of elongated flotation units extending from one side only of the barrier sheet horizontally each with its longitudinal axis perpendicular to the vertical plane of the barrier sheet and a counter-weight means attached to the distal end of each flotation unit and in spaced relation to the barrier sheet to move the center of gravity of the assembly away from the barrier sheet a desired amount so as to maintain the barrier sheet in the upright position, the side of the barrier sheet opposite the flotation units being free of protrusions.

7. A floating barrier as set forth in claim 6 in which the flotation units are elongated foldable and inflatable bags.

8. A floating barrier assembly as set forth in claim 7 in which said barrier sheet is provided with other flotation means having sufficient buoyancy to prevent the assembly from sinking before the bags are inflated.

* * * * *